US010765954B2

(12) United States Patent
Malyuk

(10) Patent No.: US 10,765,954 B2
(45) Date of Patent: Sep. 8, 2020

(54) VIRTUAL EVENT BROADCASTING

(71) Applicant: Microsoft Technology Licensing, LLC, Redmond, WA (US)

(72) Inventor: Michael William Malyuk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 626 days.

(21) Appl. No.: 15/624,533

(22) Filed: Jun. 15, 2017

(65) Prior Publication Data

US 2018/0361258 A1    Dec. 20, 2018

(51) Int. Cl.
| | | |
|---|---|---|
| *A63F 13/86* | (2014.01) | |
| *A63F 13/335* | (2014.01) | |
| *A63F 13/847* | (2014.01) | |
| *A63F 13/52* | (2014.01) | |
| *A63F 13/79* | (2014.01) | |
| *A63F 13/87* | (2014.01) | |
| *A63F 13/5372* | (2014.01) | |

(52) U.S. Cl.
CPC ............ *A63F 13/86* (2014.09); *A63F 13/335* (2014.09); *A63F 13/52* (2014.09); *A63F 13/5372* (2014.09); *A63F 13/79* (2014.09); *A63F 13/847* (2014.09); *A63F 13/87* (2014.09)

(58) Field of Classification Search
None
See application file for complete search history.

(56) References Cited

U.S. PATENT DOCUMENTS

| | | |
|---|---|---|
| 6,877,134 B1 | 4/2005 | Fuller et al. |
| 7,460,149 B1 | 12/2008 | Donovan et al. |
| 8,289,185 B2 | 10/2012 | Alonso |
| 8,515,253 B2 | 8/2013 | Cottrell |
| 8,660,673 B2 | 2/2014 | Short |
| 9,124,856 B2 | 9/2015 | Deshpande et al. |

(Continued)

OTHER PUBLICATIONS

Kim, et al., "Tracking real-time user experience (TRUE): a comprehensive instrumentation solution for complex systems", In Proceedings of the SIGCHI Conference on Human Factors in Computing Systems, Apr. 5, 2008, pp. 443-452.

(Continued)

*Primary Examiner* — Tramar Y Harper
(74) *Attorney, Agent, or Firm* — Alleman Hall Creasman & Tuttle LLP

(57) ABSTRACT

A broadcast augmentation computing system comprises a logic machine and a storage machine. The storage machine holds instructions executable by the logic machine to receive dynamically-updating state information reported by an application providing an interactive virtual event. The dynamically-updating state information at least indicates positions of avatars and objects within a virtual environment of the interactive virtual event, such positions being generated by the application. Based at least on the state information, a plurality of insights for review by a broadcaster are identified. Based on one or more relevance filtering parameters, the plurality of insights is filtered to identify insights as relevant for the current state of the application. The relevant insights are presented to the broadcaster for deliver to one or more viewers of a broadcast of the interactive virtual event.

20 Claims, 6 Drawing Sheets

(56) References Cited

U.S. PATENT DOCUMENTS

| | | | |
|---|---|---|---|
| 9,378,270 B2 | 6/2016 | Sekar | |
| 2002/0083468 A1 | 6/2002 | Dudkiewicz | |
| 2003/0038805 A1* | 2/2003 | Wong | A63F 13/12 345/473 |
| 2006/0052168 A1 | 3/2006 | Shacham | |
| 2006/0240894 A1 | 10/2006 | Andrews | |
| 2007/0117635 A1* | 5/2007 | Spanton | A63F 13/12 463/43 |
| 2008/0096663 A1* | 4/2008 | Lieberman | A63F 13/10 463/42 |
| 2008/0108432 A1 | 5/2008 | Cohen et al. | |
| 2009/0286604 A1* | 11/2009 | Clowes | A63F 13/12 463/42 |
| 2010/0223223 A1 | 9/2010 | Sandler et al. | |
| 2011/0128382 A1 | 6/2011 | Pennington et al. | |
| 2011/0151971 A1 | 6/2011 | Altshuler et al. | |
| 2012/0028700 A1* | 2/2012 | Avent | A63F 13/537 463/23 |
| 2013/0035989 A1 | 2/2013 | Brown et al. | |
| 2014/0018165 A1* | 1/2014 | Kern | A63F 13/355 463/31 |
| 2014/0157307 A1 | 6/2014 | Cox | |
| 2014/0187317 A1* | 7/2014 | Kohler | A63F 13/497 463/31 |
| 2014/0274368 A1* | 9/2014 | Cotter | A63F 13/355 463/31 |
| 2015/0071618 A1 | 3/2015 | Petajan et al. | |
| 2015/0193472 A1 | 7/2015 | Medvedovsky et al. | |
| 2015/0248917 A1 | 9/2015 | Chang et al. | |
| 2016/0158656 A1* | 6/2016 | Condrey | A63F 13/86 463/31 |
| 2016/0361646 A1* | 12/2016 | Perry | A63F 13/355 |
| 2017/0006322 A1* | 1/2017 | Dury | H04N 21/254 |
| 2017/0087460 A1* | 3/2017 | Perry | A63F 13/35 |
| 2017/0228600 A1* | 8/2017 | Syed | G06K 9/00751 |
| 2018/0268775 A1* | 9/2018 | Horneff | A63F 13/335 |
| 2019/0314728 A1* | 10/2019 | Sullivan | A63F 13/35 |

OTHER PUBLICATIONS

"Edge Video Analytics", In Technical white paper, Nov. 2016, pp. 1-24.

* cited by examiner

VIRTUAL EVENT BROADCASTING

BACKGROUND

Interactive virtual events (e.g., video games) can include any number of players interacting with each other within a virtual environment using player-controlled avatars (visually perceptible player-controlled objects in the virtual environment). Such events often take the form of competitions, in which two or more players or teams compete against each other to achieve an objective. Such events have become a popular form of entertainment for millions of fans and viewers, who may attend local events in person and/or watch from home via the Internet.

DETAILED DESCRIPTION

Figure 1:
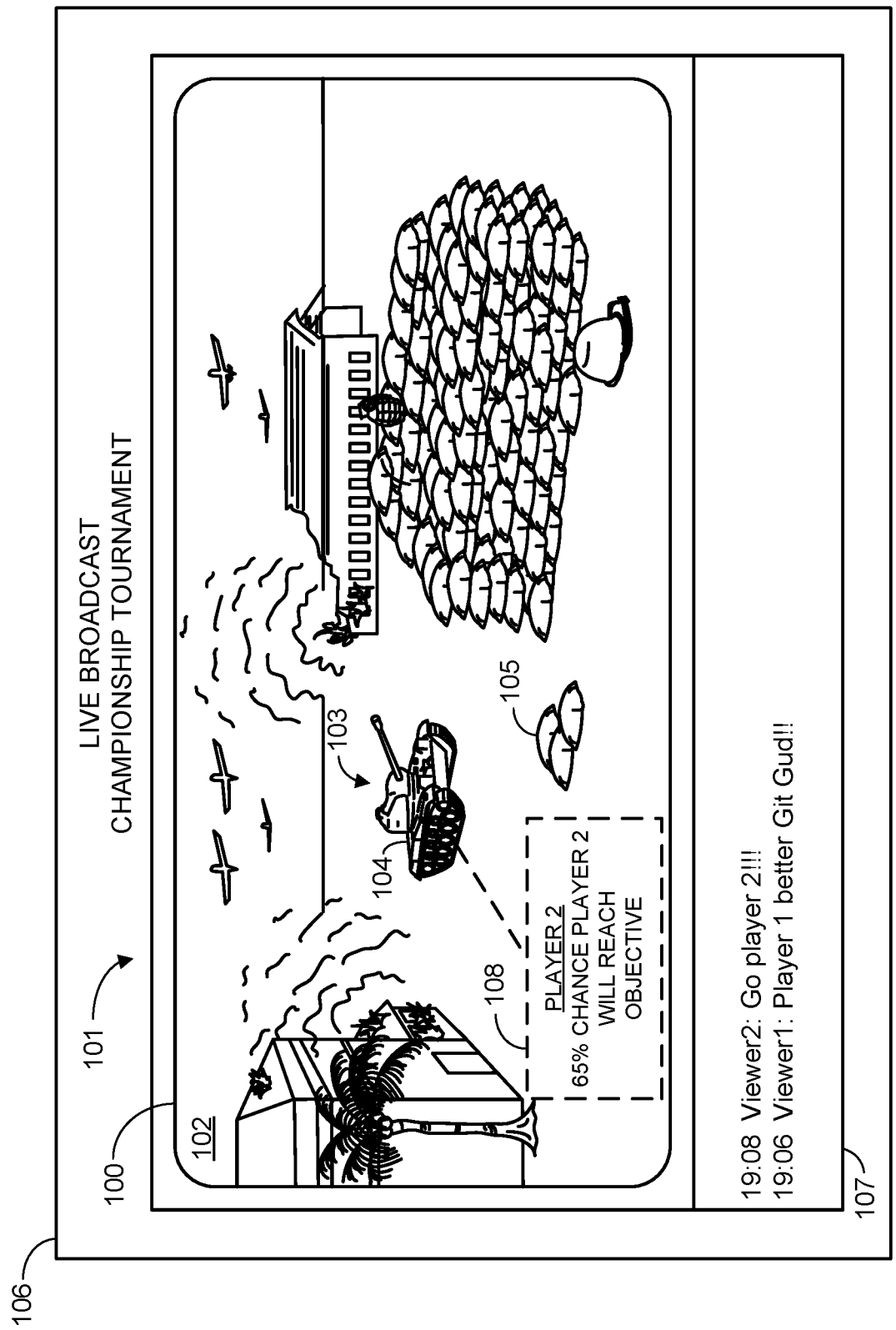
FIG. 1 shows an example broadcast of an interactive virtual event.

Interactive virtual events, and especially multiplayer video game competitions, are becoming increasingly popular among both physically present and online viewers. Viewer enjoyment of these events can be enhanced when live footage of the event is augmented with commentary, statistics, predictions, and/or other insights that pertain to specific occurrences in the event as they happen. However, existing solutions for augmenting event broadcasts are generally optimized for traditional real-world activities, such as live sporting events. Accordingly, these solutions rely on visual analysis of video footage from the sporting event (or direct observation of the activity), and require human broadcasters to decide which statistics and analyses are relevant as the event unfolds.

The present disclosure therefore relates to techniques for augmenting a broadcast of an interactive virtual event. This includes generating a plurality of insights pertaining to the interactive virtual event for review by a broadcaster, the insights being generated based on dynamically-updating state information received from an application providing the interactive virtual event. This plurality of insights is filtered based on relevance filtering parameters to identify certain insights as being particularly relevant to a current state of the interactive virtual event. A broadcaster can then choose to augment a broadcast of the interactive virtual event with one or more of the generated insights, so as to enhance the viewing experience for viewers of the broadcast. In some cases, the broadcaster need not even be a human, but rather could be a non-human, computerized broadcaster configured to provide commentary and augment the broadcast with relevant insights.

Notably, the broadcast augmentation techniques described herein are particularly applicable to interactive virtual events that take place in computer-generated environments. In this setting, insights used to augment the broadcast may be generated based on dynamically-updating state information reported by the currently-executing software application providing the interactive virtual event. In other words, positions of avatars and game objects (e.g., goalposts, powerups, bullet trajectories) may be generated by the currently-executing application, and thus may be defined exactly by the dynamically-updating state information. This provides advantages over traditional broadcast augmentation techniques, as it alleviates the need to visually process video footage of an event, and eliminates the guesswork, sensing or interpretation that is often necessary to determine exact player positions from video footage constrained to specific camera angles.

As used herein, "avatar" refers to any visually perceptible item in a virtual environment which can be controlled by a player. Example of avatars include human- or other creature/animal-like figures, vehicles, monsters, drones, robots, and spacecraft to name but a few examples. In most cases, the avatars will be movable via control inputs provided by players interacting with a computing device. In some cases, as will be apparent from the context, uses of the term "player" and "avatar" may be interchangeable. For example, if a controlled avatar has acquired a certain type of weapon in a game, one could also say that the controlling player has acquired the weapon, or that the controlling player is particularly adept with the weapon (e.g., based on prior performances with that weapon while controlling one or more avatars during prior events).

FIG. 1 depicts an example broadcast 100 of an interactive virtual event 101 from the perspective of an online viewer. As shown, broadcast 100 is a visual representation of gameplay from a multiplayer video game competition. As will be described in more detail below, an interactive virtual event may take any suitable form. Generally it will involve at least one player interacting, through control of an avatar, with a virtual environment (e.g., virtual environment 102) that is provided by a currently-executing software application of at least one computing device. In the example of FIG. 1, a video game application is accepting input from multiple human players, and generating visual content in response. One avatar 103 (i.e., a tank controlled by Player 2) is visible within broadcast 100 at a position 104, though it will be understood that an interactive virtual event may include any number of human and/or non-human players, potentially divided up into any suitable number of teams or groups. The virtual interactive event may also include any of a variety of non-player objects, such as object 105. The visual content is made available to one or more viewers of the interactive virtual event, who may view the visual content in any suitable way. In some cases, the visual content is made available via a suitable computer network such as, for example, the Internet, and the viewers view the visual content using their own personal computing devices, for example by browsing to a specific website or launching an application.

In FIG. 1, broadcast 100 is shown to the viewer as part of an interface 106. As indicated above, this interface may be presented to the viewer in a variety of suitable ways. As examples, interface 106 may be presented to the user upon browsing to a specific website, or launching a particular application. As indicated, interface 106 may include multiple text comments 107 provided by viewers of broadcast 100. Such comments may indicate viewer interest in the interactive virtual event and can be used to modify how the broadcast is augmented, as will be described in more detail below.

It will be understood that broadcast 100, interface 106, and text comments 107 are presented for the sake of example, and are not intended to limit the present disclosure. Visual content from any suitable interactive virtual event may be broadcast to any suitable number of viewers, who may be present in the same environment as participants in the event (e.g., spectating in a designated stadium or arena), or viewing the event remotely (e.g., streaming the broadcast via the Internet). Interactive virtual events can include competitions (e.g., multiple human players competing against one another, a single human player competing against computer-controlled adversaries, or a collection of computer-controlled entities competing against one another), collaborative multiplayer games (e.g., multiple human players working via avatars together to overcome a challenge), single-player video game events (e.g., a human-controlled avatar "speed-running," or attempting to complete a game as quickly as possible), as well as other events in which one or more entities interact within a virtual environment provided by a software application. Broadcasts of such events may be distributed and viewed in any suitable way, and via any suitable interface.

As indicated above, viewer enjoyment of interactive virtual event broadcasts may be enhanced when such broadcasts are augmented with one or more insights pertaining to the interactive virtual event. This is also shown in FIG. 1, in which broadcast 100 has been augmented with an example insight 108 indicating that Player 2 has a 65% chance of reaching an objective within the game. Insights such as insight 108 can help viewers to better understand occurrences within the interactive virtual event, how specific players/teams are performing, how the current interactive virtual event compares to previous or similar events, strategies that players within the event may be employing, etc.

Figure 2:
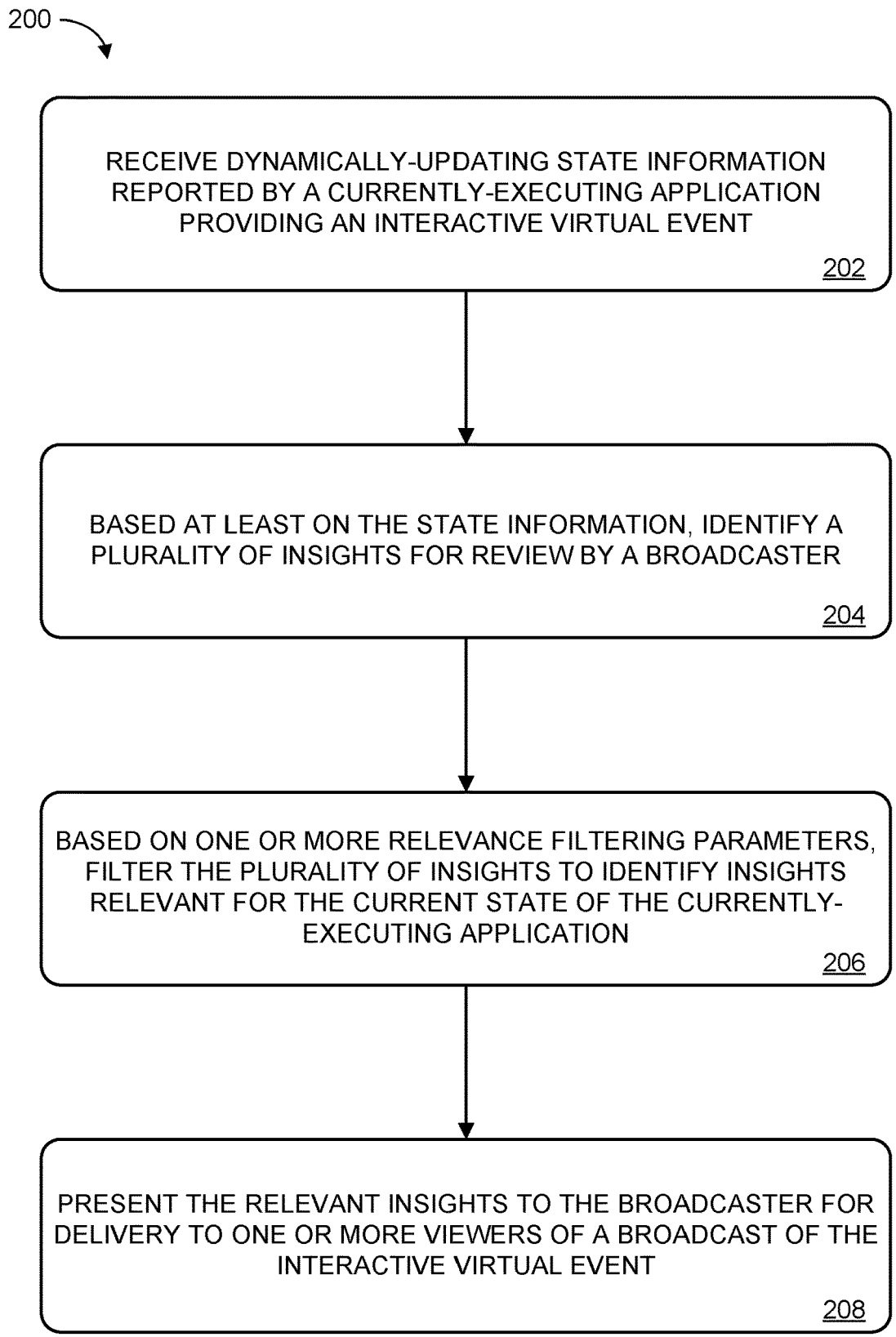
FIG. 2 illustrates an example method for broadcast augmentation.

Accordingly, FIG. 2 illustrates an example method 200 for broadcast augmentation. At 202, method 200 includes receiving dynamically-updating state information reported by a currently-executing application providing an interactive virtual event. This may occur in any of a variety of ways. In an example scenario, a number of human players may participate in the interactive virtual event by providing control inputs to a currently-executing application (e.g., a video game application). The currently-executing application may be hosted at least partially on a dedicated game server. It may interpret and aggregate data and control inputs received from one or more player-facing computing devices (e.g., video game consoles) to facilitate a consistent virtual environment with which each of the players may interact substantially simultaneously via avatars. In other words, the currently-executing application may generate a set of data that describes a current state of the interactive virtual event, and that dynamically updates as the event unfolds (e.g., as control inputs from players are received).

Figure 3:
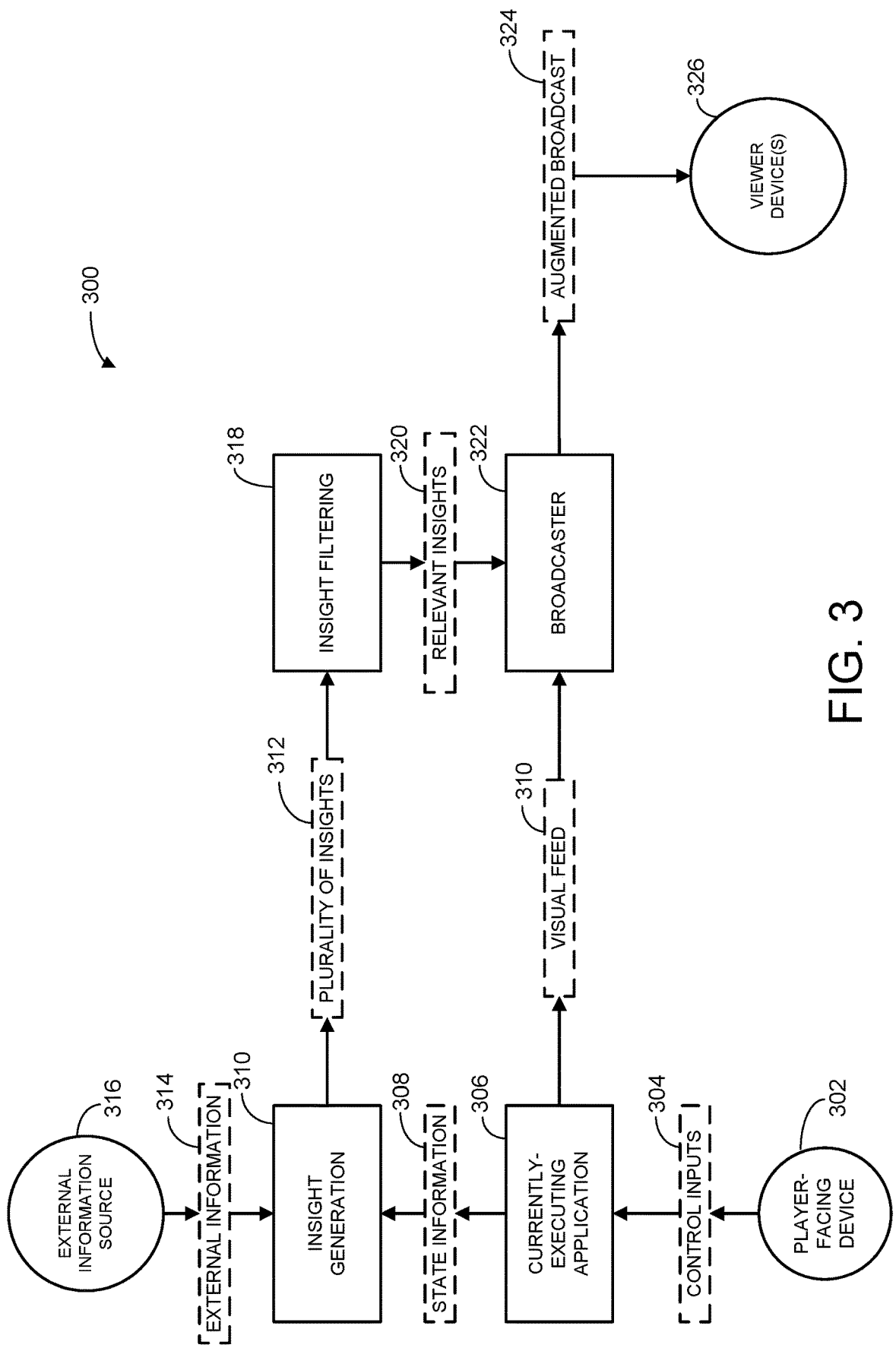
FIG. 3 schematically illustrates an example environment for generating insights and augmenting a broadcast of an interactive virtual event.

This scenario is schematically illustrated in FIG. 3, which shows an example environment 300 in which broadcast augmentation may occur. In FIG. 3, circles generally refer to separate computing devices, solid boxes refer to separate functions performed by software, and dashed boxes refer to information that is transmitted between the various devices or software applications. In some implementations, each of the services listed in solid boxes may be implemented on separate computing devices, with the information listed in the dashed boxes being transmitted between the various devices. In other implementations, two or more of the services may be implemented on a single computing device, running multiple different software applications, while the information from the dashed boxes is passed between the different software applications. This device could be, for example, a game console, dedicated game server, data aggregation server, etc.

While the devices used by viewers to view the broadcast will generally be separate from the other services/devices in FIG. 3, functions of the player-facing device, external information source, and/or the device(s) hosting the currently-executing application, insight generation, insight filtering, and broadcasting services may be performed by any suitable number of devices. As an example, the player-facing device could be implemented as a game console or personal computer that, via execution of an application, provides an interactive virtual event including a plurality of players competing in a virtual environment generated by the application, and receives control inputs from each of the plurality of players. Based on the control inputs, the player-facing device may dynamically update a current state of the application, including dynamically updating positions of objects and any avatars in the virtual environment. The player-facing device may then perform additional steps of method 200, as will be described in more detail below.

In general, the devices and services shown in FIG. 3 may be expanded or collapsed into any suitable number of computing devices, with information transmission occurring either inter-device or intra-device, as appropriate. Any or all of these computing devices may be implemented as computing system 600 described below with respect to FIG. 6.

Turning now to the specific flow of information shown in FIG. 3, environment 300 includes a player-facing device 302, which may receive control inputs 304 from one or more human players, and pass such control inputs along to a currently-executing application 306 providing an interactive virtual event. The player-facing device may be implemented as a game console, personal computer, etc., and may receive control inputs from human players in any suitable way (e.g., manipulation of a video game controller, mouse/keyboard, gestures, vocal commands). Notably, the currently-executing application may run entirely on player-facing device 302, entirely on a separate game server, or portions of the currently-executing application may be divided between the game server and any game consoles participating in the interactive virtual event.

Based at least on the control inputs and the specific programming of the currently-executing application, the currently-executing application reports a set of dynamically-updating state information describing a current state of the interactive virtual event. In FIG. 3, this is shown as state information 308. Dynamically-updating state information may take any suitable form, depending on the nature of the interactive virtual event. In some cases, the dynamically-updating state information will at least include positions of avatars and objects within a virtual environment of the interactive virtual event, such positions being generated by the currently-executing application. Positions of the avatars and objects may be defined in any suitable way, and with any suitable granularity. As an example, avatar and object positions may be given as three-dimensional coordinates relative to a coordinate system of the virtual environment.

As used herein, and as discussed above, "player" and "avatar" typically refer, respectively, to a human player and a perceptible element in a virtual environment that the player controls with a smartphone, game controller, etc. At times, however, the two terms can be used interchangeably. Within an interactive virtual event, avatars can take the form of a humanoid figure, animal, fictional creature, vehicle, and/or any other suitable controllable entity. Any non-human-controlled entities in the virtual environment typically are referred to herein as "objects," and can include computer-controlled characters, items, weapons, buildings, landmarks, etc.

It will be understood that the dynamically-updating state information can define virtually any information pertaining to the current state of the interactive virtual event. In an example scenario, the interactive virtual event may take the form of a competitive multiplayer video game. In this example, each player will generally have a different avatar, each having a unique appearance, three-dimensional position (relative to the virtual environment), set of skills/weapons, class, character identity (e.g., in games in which players choose from a selection of unique characters), etc. These avatars may move through and interact with a virtual environment, which may in turn have its own unique identifier (e.g., in games that have multiple different maps or arenas). The virtual environment may include a variety of different landmarks, objectives, points-of-interest, etc., each having their own unique virtual positions (e.g., two-dimensional or three-dimensional positions), and which the players may be able to interact with (e.g., by firing a weapon at a building to damage it or otherwise change its appearance). In some interactive virtual events, a variety of consumable weapons, powerups, or other items may be spread throughout the virtual environment, the positions of which may be defined by the dynamically-updating state information. Further, different interactive virtual events may feature different objectives or game modes, and have scores or rankings defined by player actions. The dynamically-updating state information reported by the currently-executing application can include any or all of the above information, as well as additional information not described herein.

Further, in some cases, the dynamically-updating information can include an indication of an upcoming occurrence in the interactive virtual event which the players themselves are unaware of. As examples, the dynamically-updating state information may indicate that a particular item will appear in five seconds, or that additional computer-controlled enemies will appear at a particular location within the virtual environment. This can enable the generation of broadcast insights that can enrich the experience for viewers, based on information that even the players themselves are unaware of.

As the interactive virtual event takes place, a visual feed of the event may be output by the currently-executing application for augmentation by a broadcaster. This is shown in FIG. 3 as visual feed 310. The visual feed may take any suitable form, and may capture the interactive virtual event from any suitable perspective or combination of perspectives. As examples, the visual feed may follow specific avatars, focus on important objects, give an overhead view of the virtual environment, etc. In some cases, the visual feed may be manipulable by the broadcaster, such that the broadcaster can freely move a virtual camera throughout the virtual environment, enabling the broadcaster to focus on players and events that they or their viewers may find interesting. Augmentation of the visual feed will be described in more detail below.

Returning briefly to FIG. 2, at 204, method 200 includes, based at least on the state information, identifying a plurality of insights for review by a broadcaster. In FIG. 3, insight generation occurs at 310, resulting in a plurality of insights 312. In some cases, insight generation may be based on external information pertaining to the interactive virtual event received from one or more external information sources, in addition to the dynamically-updating state information. In FIG. 3, external information 314 is received from an external information source 316. External information source 316 may be, for example, one or more remote computers accessed via a computer network, such as the Internet. However, as indicated above, the external information source may be implemented in any suitable way, and in some examples may be located on the same computing device running the currently-executing information. The external information may take any suitable form. As examples, the external information may include records of previous interactive virtual events, performance histories for players/avatars and teams participating in the interactive virtual event, trivia information pertaining to the interactive virtual event, etc.

As indicated above, insights may take a variety of suitable forms. In some examples, insights can include predictions of an outcome of the interactive virtual event, and/or predictions of specific occurrences within the interactive virtual event. Using the example of FIG. 1, insight 108 indicates that Player 2 has a 65% chance of capturing an objective. A similar insight might indicate that a specific team has a 70% chance of winning a particular match. In other examples, insights may indicate the performance of specific players, teams, groups, non-player characters, etc., within the interactive virtual event. For example, an insight might indicate how many kills a certain player has earned during a match, while another insight might describe how many objectives a team has collectively captured during a tournament. As another example, insights can include comparisons between actions taken by players, teams, non-player characters, etc. during the interactive virtual event and similar actions during previous interactive virtual events. For example, an insight might indicate that a player has just acquired a weapon that they have historically been very effective with, while another insight might indicate that a group of players is gathering at a location in the virtual environment that has been important in previous interactive virtual events.

It will be understood that insights can include virtually any information that viewers of the interactive virtual event might find interesting, and that can be generated based on the dynamically-updating state information and/or any available external information. As additional examples, insights can describe avatar/player positions relative to their teammates, their competitors, non-player characters, notable landmarks within the virtual environment, important items, upgrades, weapons, etc. Insights can provide analysis of occurrences in the interactive virtual event, for example by indicating that a player appears to be moving toward a specific part of the map to meet up with teammates, or that a team appears to be preparing to utilize a well-known strategy. Insights can be visually presented in any suitable way, such as static text, banners, graphs, moving graphics, etc.

Insight generation can be performed in any suitable way, and can vary from implementation to implementation. For example, an insight that merely gives a player's distance away from another player can be generated simply by consulting the two players' positions given by the dynamically-updating state information (e.g., comparison of avatar position). A different insight that compares a player's current score to the player's average score in previous interactive virtual events may be generated by consulting the dynamically-updating state information to identify the player's current score, and consulting available external information to determine how the player has scored during previous events.

In some examples, insight generation may rely on some amount of machine learning to produce more complicated or interesting insights. As an example, a particular insight might indicate that a team has a 70% chance of winning a match. To generate this insight, the insight generation service may use a variety of variables from historical records of previous interactive virtual events (e.g., scores, player identities, player positions, virtual environment identifiers, game objectives, weapon loadouts), and determine how such variables statistically correlate with a team's chance at winning. It will be understood that insights may be generated in ways not described herein, and that the specific insight generation techniques used will generally vary depending on the interactive virtual event, and the types of insights desired.

In some cases, the plurality of generated insights may include at least some insights that are not particularly relevant to the current state of the interactive virtual event. As an example, an insight might indicate that a player is five meters from a specific weapon, although an experienced player would know that the specific weapon would not be particularly useful in the player's current position. Another insight might indicate how many kills a player has earned during a current match, which may be relevant when the objective of the match is scoring as many kills as possible, though may be less relevant when the match has a different objective. In some cases, this can be at least partially alleviated by allowing the broadcaster to select certain categories of insights to be generated, though even within the selected categories, some generated insights will likely be more relevant than others. Returning briefly to FIG. 2, once the plurality of insights has been generated, method 200 includes, at 206, based on one or more relevance filtering parameters, filtering the plurality of potential insights to identify insights as relevant for the current state of the currently-executing application. In FIG. 3, insight filtering occurs at 318, and results in a set of relevant insights 320.

Figure 4:
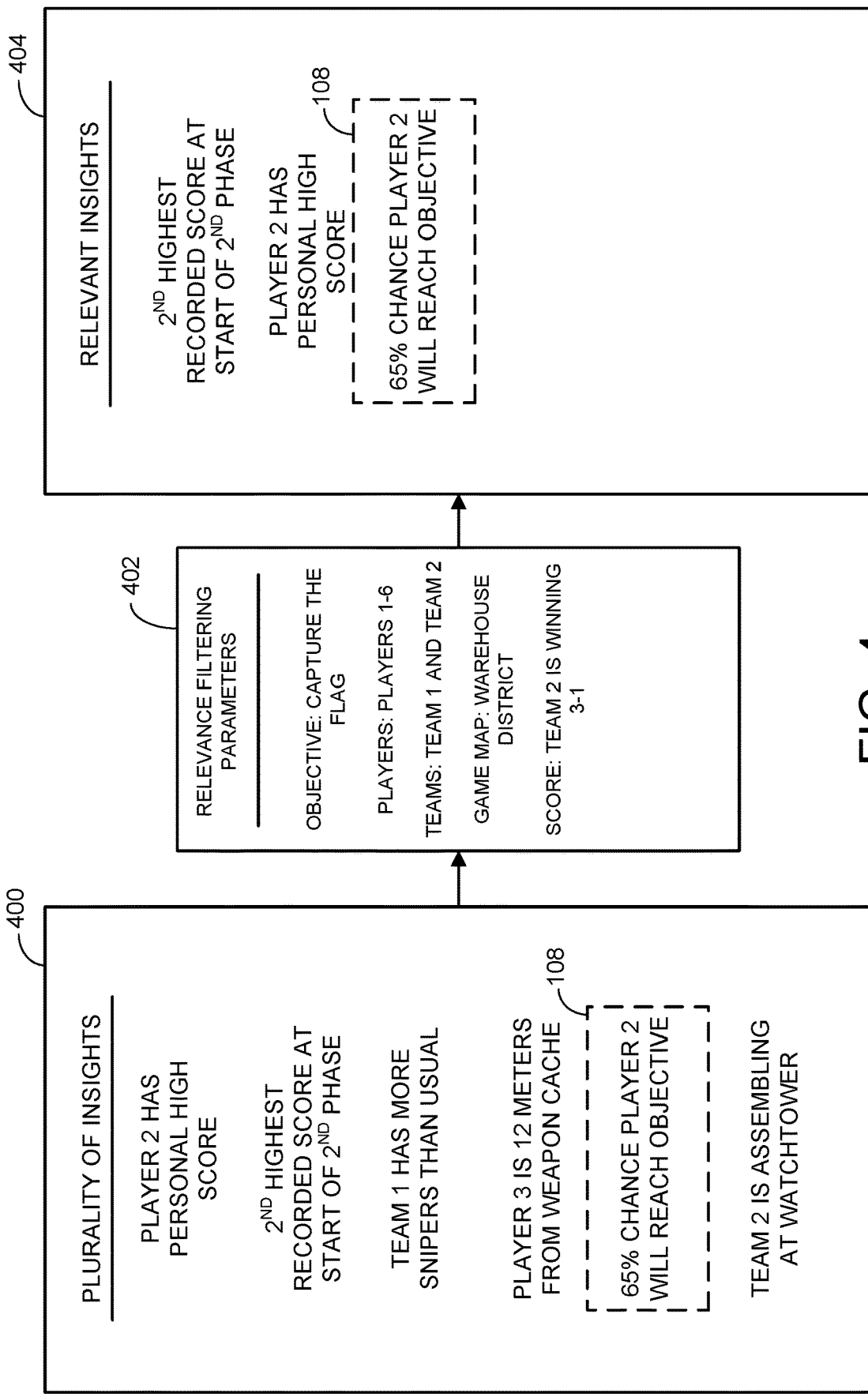
FIG. 4 illustrates filtering of a plurality of insights based on relevance filtering parameters.

Insight filtering is described in further detail with respect to FIG. 4, which shows a plurality of generated insights 400, including insight 108 previously shown in FIG. 1. It will be understood that some insights of plurality 400 may be more relevant to the current state of the interactive virtual event than others. Accordingly, plurality of insights 400 is filtered by one or more relevance filtering parameters 402 to give a set of insights identified as relevant (i.e., relevant insights 404).

Relevance filtering parameters can take any suitable form, and be applied in any suitable way. In general, a relevance filtering parameter will take some set of variables pertaining to the current state of the currently-executing application into account, and filter the generated insights based on their relevance to the set of variables. As non-limiting examples, the one or more relevance filtering parameters can filter the plurality of insights on the basis of: (1) a current objective of the interactive virtual event, (2) identities of players participating in the interactive virtual event, (3) identities of teams participating in the interactive virtual event, (4) an identifier of the virtual environment in which the interactive virtual event is taking place, and (5) a current score of the interactive virtual event. For example, when relevance filtering is performed on the basis of the current objective of the event, an insight that indicates how many kills a player has earned during a match may not be identified as relevant when the objective is capturing objectives, rather than earning kills. In contrast, the same relevance filtering parameter might identify a different objective that predicts a player's chance at capturing an objective as being relevant. For example, in FIG. 4, insight 108 has been identified as relevant, and is listed in the set of relevant insights 404.

Relevance filtering parameters can have any suitable degree of specificity. For example, a broad relevance filtering parameter may only filter the plurality of insights based on their relevance to a current virtual environment of the interactive virtual event. A different, more specific relevance filtering parameter might only select insights that are relevant to specific players, having specific positions and specific weapons, within a specific virtual environment. The specificity of the relevance filtering parameters used can be automatically determined based on the situation, and/or determined by the broadcaster. As an example, if fewer than some threshold number of insights are identified as being relevant, then the insight filtering service may switch to using less specific relevance filtering parameters, so as to provide more augmentation options to the broadcaster.

The relevance assigned to a particular insight by a relevance filtering parameter can take any suitable form. In an example scenario, an insight may be given a particular score corresponding to each variable considered by the relevance filtering parameter (event objective, player identities, virtual environment identifier, etc.). This score can be binary (e.g., a score of "0" for irrelevance and a score of "1" for relevance), or assume suitable non-binary values. Insights that have higher than a threshold relevance score (e.g., at least 0.7) can be automatically identified as relevant, while insights with below the threshold relevance score may be passed over. In some cases, relevance scoring can change over time, as the relevance filtering parameters are modified to more consistently identify insights that viewers and broadcasters find relevant.

Relevance filtering parameters may be generated and/or modified in any suitable way. In some cases, they can be pre-programmed, for example by developers of the currently-executing application, or by organizers of the interactive virtual event. In other cases, relevance filtering parameters can be manually defined by the broadcaster, and/or automatically developed over time. For example, the insight filtering service may dynamically create and modify relevance filtering parameters to more consistently identify insights that players or broadcasters feel are relevant. This may be done, for example, by evaluating over time which insights broadcasters tend to augment broadcasts with during specific situations. Additionally, or alternatively, the insight filtering service can interpret viewership numbers or viewer feedback (e.g., text comments 107 of FIG. 1) provided by a broadcast distribution service (e.g., an online streaming site) to identify which insights the viewers found most relevant. In general, relevance filtering parameters can be generated and maintained in any suitable way.

Returning briefly to FIG. 2, once the relevant insights have been identified, method 200 includes, at 208, presenting the relevant insights to the broadcaster for delivery to one or more viewers of a broadcast of the interactive virtual event. This is depicted in FIG. 5, which again shows broadcast 100 of the interactive virtual event, this time as part of an example broadcaster's interface 500. Broadcaster's interface 500 also includes the set of relevant insights 404, which the broadcaster may review and select from to augment the broadcast. For example, in FIG. 5, the broadcaster has chosen to augment broadcast 100 with insight 108. It will be understood that the broadcaster can select any or all of the relevant insights for broadcast augmentation. Further, in some cases, the broadcaster may additionally have access to any or all of the generated insights, even those insights not identified as being relevant. For example, in FIG. 5, the list of relevant insights 404 has an option to "view more insights," which upon selection by the broadcaster, may provide the broadcaster with generated insights from plurality 404. It will be appreciated that broadcaster interface 500 is presented in a relatively simple form, and that any depiction, structure, hierarchy or interface paradigm may be employed to expose insights to broadcasters and enable them to make use of those insights.

Augmentation of a broadcast with generated insights may be done in any suitable way, and broadcast augmentations may have any suitable appearance, as just indicated above. For example, the broadcaster may select certain insights by interacting with an interface, such as interface 500, by clicking, dragging-and-dropping, using gestures, providing vocal commands, etc. Once added to the broadcast, insights can appear as static text, moving banners, graphics (e.g., graphs, histograms, pie charts), etc. Insights may be manually placed at specific locations relative to visual content in the broadcast by the broadcaster, and/or automatically placed at predefined locations. Further, some insights may dynamically move as the interactive virtual event unfolds. For example, insight 108 may dynamically move as player 2 moves.

It will be understood that the broadcaster may have access to additional or alternative broadcast augmentation methods beyond the selection of insights. For example, the broadcaster may use a microphone to provide vocal commentary, type text comments that are appended to the broadcast or shown in a commentary box, use drawing tools to manually highlight specific players or objects, etc.

Figure 5:
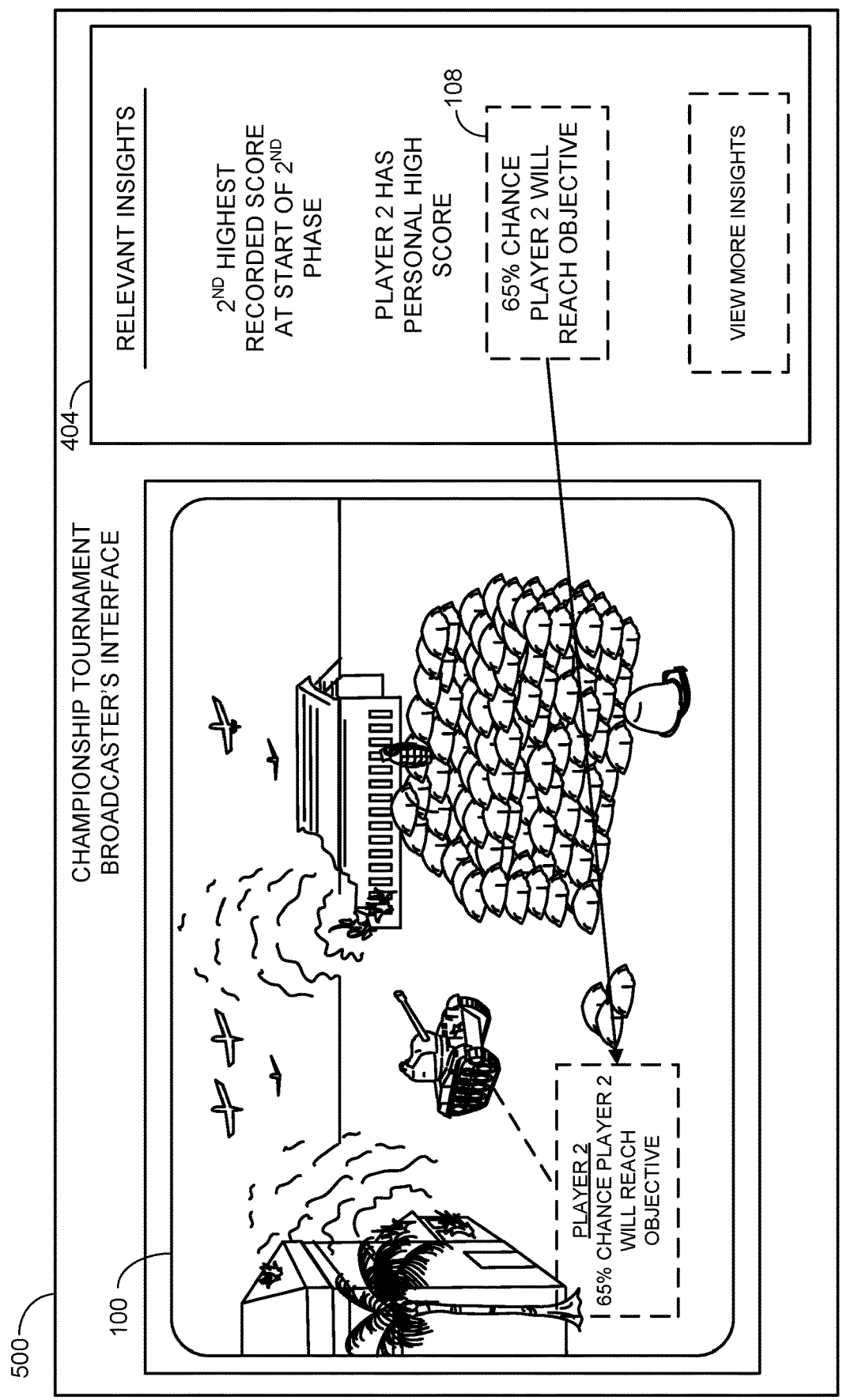
FIG. 5 illustrates an example interface by which a broadcaster may augment a broadcast of an interactive virtual event.

It will be understood that while the description of FIG. 5 contemplates a human broadcaster manually selecting insights and augmenting the broadcaster, the broadcast augmentation techniques described herein may be performed without human intervention. For example, the broadcaster may be implemented as a non-human, computerized broadcaster service configured to automatically provide commentary for the interactive virtual event, and automatically augment the broadcast with relevant insights. In this case, the broadcaster service may automatically augment the broadcast with all of the insights identified as relevant, a set number of relevant broadcasts, etc.

As broadcast augmentation occurs, the augmented broadcast may be distributed for view by one or more viewers. Returning briefly to FIG. 3, visual feed 310 is augmented with one or more insights by a broadcaster 322, and distributed as augmented broadcast 324 to one or more viewer devices 326. As indicated above, this may be done in a variety of suitable ways. For example, the augmented broadcast may be distributed over as suitable computer network, such as the Internet, and the viewers may access the broadcast by navigating to a specific website, or launching a specific application.

Further, while the present disclosure generally describes distributing an "augmented broadcast," it will be understood that not every frame of the distributed broadcast will necessarily include augmentations. In other words, there may be periods of time during the broadcast during which no insights have been added to the broadcast, the broadcaster is not providing vocal or text commentary, etc. Accordingly, as used herein, "augmented broadcast" refers to a broadcast that has had at least one augmentation applied during at least one frame.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
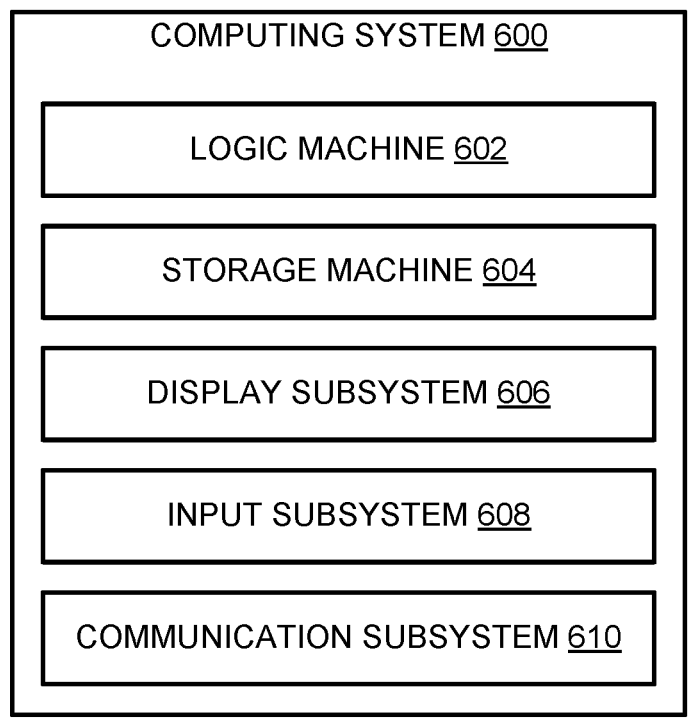
FIG. 6 schematically illustrates a computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally, or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In an example, a broadcast augmentation computing system comprises: a logic machine; and a storage machine holding instructions executable by the logic machine to: receive dynamically-updating state information reported by a currently-executing application providing an interactive virtual event, the dynamically-updating state information at least including positions of avatars and objects within a virtual environment of the interactive virtual event, such positions being generated by the currently-executing application; based at least on the state information, identify a plurality of insights for review by a broadcaster; based on one or more relevance filtering parameters, filter the plurality of insights to identify insights relevant for a current state of the currently-executing application; and present the relevant insights to the broadcaster for delivery to one or more viewers of a broadcast of the interactive virtual event. In this example or any other example, the interactive virtual event is a live competition. In this example or any other example, players provide control inputs to the currently-executing application to control at least some of the avatars to participate in the interactive virtual event, causing the state information to dynamically update. In this example or any other example, the dynamically-updating state information includes an indication of an upcoming occurrence in the interactive virtual event, and the currently-executing application is configured so that players controlling avatars of the interactive virtual event are unaware of the upcoming occurrence. In this example or any other example, the plurality of insights is further identified based on external information pertaining to the interactive virtual event received from one or more external information sources. In this example or any other example, the external information includes one or more of records of previous interactive virtual events, performance histories for players and teams participating in the interactive virtual event, and trivia information pertaining to the interactive virtual event. In this example or any other example, the plurality of insights includes predictions of an outcome of the interactive virtual event. In this example or any other example, the plurality of insights includes statistics regarding player performance during the interactive virtual event. In this example or any other example, the plurality of insights includes comparisons between player actions during the interactive virtual event and player actions during previous interactive virtual events. In this example or any other example, the one or more relevance filtering parameters filter the plurality of insights on the basis of one or more of: a current objective of the interactive virtual event, identities of players participating in the interactive virtual event, identities of teams participating in the interactive virtual event, an identifier of the virtual environment in which the interactive virtual event is taking place, and a current score of the interactive virtual event. In this example or any other example, the instructions are further executable to modify the relevance filtering parameters based on viewer feedback for the interactive virtual event. In this example or any other example, the broadcaster is a non-human, computerized broadcaster configured to automatically provide commentary for the interactive virtual event. In this example or any other example, the instructions are further executable to, based on broadcaster input, augment the broadcast of the interactive virtual event with one or more of the plurality of insights.

In an example, a computer-implemented method for broadcast augmentation comprises: receiving dynamically-updating state information reported by a currently-executing application providing an interactive virtual event, the dynamically-updating state information at least including positions of avatars and objects within a virtual environment of the interactive virtual event, such positions being generated by the currently-executing application; based at least on the state information, identifying a plurality of insights for review by a broadcaster; based on one or more relevance filtering parameters, filtering the plurality of insights to identify insights relevant for a current state of the currently-executing application; and presenting the relevant insights to the broadcaster for delivery to one or more viewers of a broadcast of the interactive virtual event. In this example or any other example, the dynamically-updating state information includes an indication of an upcoming occurrence in the interactive virtual event, and the currently-executing application is configured so that players of the interactive virtual event are unaware of the upcoming occurrence. In this example or any other example, the plurality of insights is further identified based on external information pertaining to the interactive virtual event received from one or more external information sources. In this example or any other example, the plurality of insights includes predictions of an outcome of the interactive virtual event. In this example or any other example, the instructions are further executable to modify the relevance filtering parameters based on viewer feedback for the interactive virtual event. In this example or any other example, the instructions are further executable to, based on broadcaster input, augment the broadcast of the interactive virtual event with one or more of the plurality of insights.

In an example, a broadcast augmentation computing system comprises: a logic machine; and a storage machine holding instructions executable by the logic machine to: via execution of an application, provide an interactive virtual event enabling a plurality of players to compete in a virtual environment generated by the application; receive control inputs from each of the plurality of players; based on the control inputs, dynamically update a current state of the application, including dynamically updating positions of objects and avatars in the virtual environment that are controlled by the players; based on state information describing the current state of the application and historical records of previous interactive virtual events, identify a plurality of insights for review by a broadcaster; based on one or more relevance filtering parameters, filter the plurality of insights to identify insights relevant for the current state of the application; present the relevant insights to the broadcaster; based on broadcaster input, augment a broadcast of the interactive virtual event with one or more selected insights from the plurality of insights; and distribute the augmented broadcast for viewing by one or more viewers.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A broadcast augmentation computing system, comprising:
    a logic machine; and
    a storage machine holding instructions executable by the logic machine to:
        receive, at an insight generation service of the broadcast augmentation computing system, dynamically-updating state information reported by a currently-executing application providing an interactive virtual event that is dynamically affected by control inputs provided to a player-facing device, the control inputs also affecting the dynamically-updating state information, the dynamically-updating state information at least including positions of avatars and objects within a virtual environment of the interactive virtual event, such positions being generated by the currently-executing application;
        computer-analyze the dynamically-updating state information to automatically generate a plurality of insights for review at a broadcaster computing system;
        based on one or more relevance filtering parameters, filter the plurality of insights to identify insights relevant for a current state of the currently-executing application; and
        present the relevant insights to a broadcaster of the broadcaster computing system for delivery to one or more viewer computing devices receiving a broadcast of the interactive virtual event, such that one or more of the relevant insights are viewable at the one or more viewer computing devices in conjunction with the interactive virtual event.

2. The broadcast augmentation computing system of claim 1, where the interactive virtual event is a live competition.

3. The broadcast augmentation computing system of claim 1, where one or more players provide the control inputs to the currently-executing application to control at least some of the avatars to participate in the interactive virtual event, causing the state information to dynamically update.

4. The broadcast augmentation computing system of claim 1, where the dynamically-updating state information includes an indication of an upcoming occurrence in the interactive virtual event, and where the currently-executing application is configured so that players controlling avatars of the interactive virtual event are unaware of the upcoming occurrence.

5. The broadcast augmentation computing system of claim 1, where the plurality of insights is further identified based on external information pertaining to the interactive virtual event received from one or more external information sources.

6. The broadcast augmentation computing system of claim 5, where the external information includes one or more of records of previous interactive virtual events, performance histories for players and teams participating in the interactive virtual event, and trivia information pertaining to the interactive virtual event.

7. The broadcast augmentation computing system of claim 1, where the plurality of insights includes predictions of an outcome of the interactive virtual event.

8. The broadcast augmentation computing system of claim 1, where the plurality of insights includes statistics regarding player performance during the interactive virtual event.

9. The broadcast augmentation computing system of claim 1, where the plurality of insights includes comparisons between player actions during the interactive virtual event and player actions during previous interactive virtual events.

10. The broadcast augmentation computing system of claim 1, where the one or more relevance filtering parameters filter the plurality of insights on the basis of one or more of: a current objective of the interactive virtual event, identities of players participating in the interactive virtual event, identities of teams participating in the interactive virtual event, an identifier of the virtual environment in which the interactive virtual event is taking place, and a current score of the interactive virtual event.

11. The broadcast augmentation computing system of claim 1, where the instructions are further executable to modify the relevance filtering parameters based on viewer feedback for the interactive virtual event.

12. The broadcast augmentation computing system of claim 1, where the broadcaster is a non-human, computerized broadcaster configured to automatically provide commentary for the interactive virtual event.

13. The broadcast augmentation computing system of claim 1, where the instructions are further executable to, based on broadcaster input, augment the broadcast of the interactive virtual event with one or more of the plurality of insights.

14. A computer-implemented method for broadcast augmentation, comprising:
receiving, at an insight generation service of a broadcast augmentation computing system, dynamically-updating state information reported by a currently-executing application providing an interactive virtual event that is dynamically affected by control inputs provided to a player-facing device, the control inputs also affecting the dynamically-updating state information, the dynamically-updating state information at least including positions of avatars and objects within a virtual environment of the interactive virtual event, such positions being generated by the currently-executing application;
computer-analyzing the dynamically-updating state information to automatically generate a plurality of insights for review at a broadcaster computing system;
based on one or more relevance filtering parameters, filtering the plurality of insights to identify insights relevant for a current state of the currently-executing application; and
presenting the relevant insights to a broadcaster of the broadcaster computing system for delivery to one or more viewer computing devices receiving a broadcast of the interactive virtual event, such that one or more of the relevant insights are viewable at the one or more viewer computing devices in conjunction with the interactive virtual event.

15. The computer-implemented method of claim 14, where the dynamically-updating state information includes an indication of an upcoming occurrence in the interactive virtual event, and where the currently-executing application is configured so that players of the interactive virtual event are unaware of the upcoming occurrence.

16. The computer-implemented method of claim 14, where the plurality of insights is further identified based on external information pertaining to the interactive virtual event received from one or more external information sources.

17. The computer-implemented method of claim 14, where the plurality of insights includes predictions of an outcome of the interactive virtual event.

18. The computer-implemented method of claim 14, where the instructions are further executable to modify the relevance filtering parameters based on viewer feedback for the interactive virtual event.

19. The computer-implemented method of claim 14, where the instructions are further executable to, based on broadcaster input, augment the broadcast of the interactive virtual event with one or more of the plurality of insights.

20. A broadcast augmentation computing system, comprising:
a logic machine; and
a storage machine holding instructions executable by the logic machine to:
via execution of an application, provide an interactive virtual event enabling a plurality of players to compete in a virtual environment generated by the application;
receive control inputs from each of the plurality of players at one or more player-facing devices;
based on the control inputs, dynamically update a current state of the application, including dynamically updating positions of objects and avatars in the virtual environment that are controlled by the players;
based on state information describing the current state of the application and historical records of previous interactive virtual events, identify a plurality of insights for review by a broadcaster;
based on one or more relevance filtering parameters, filter the plurality of insights to identify insights relevant for the current state of the application;
present the relevant insights to the broadcaster;
based on broadcaster input, augment a broadcast of the interactive virtual event with one or more selected insights from the relevant insights; and
distribute the augmented broadcast to a plurality of viewer computing devices for viewing by one or more viewers.

* * * * *